United States Patent [19]

Hosoya

[11] Patent Number: 4,920,923
[45] Date of Patent: May 1, 1990

[54] POULTRY BREEDING METHOD

[76] Inventor: Minoru Hosoya, 412 Fukaya, Ayase-shi, Kanagawa-ken, Japan

[21] Appl. No.: 183,250

[22] Filed: Apr. 19, 1988

[30] Foreign Application Priority Data

Aug. 22, 1987 [JP] Japan ................. 62-207410

[51] Int. Cl.⁵ .......................................... A01K 39/012
[52] U.S. Cl. ................... 119/51.02; 119/22
[58] Field of Search ............ 119/21, 22, 51 R, 52 B, 119/155, 17, 52 AF, 48

[56] References Cited

U.S. PATENT DOCUMENTS

| | | | |
|---|---|---|---|
| 4,195,594 | 4/1980 | Siciliano et al. | 119/52 B |
| 4,337,729 | 7/1982 | Peppler et al. | 119/52 B |
| 4,517,923 | 5/1985 | Palmer | 119/51 R |
| 4,589,372 | 5/1986 | Smith | 119/51 R |
| 4,617,876 | 10/1986 | Hayes | 119/51 R |
| 4,624,215 | 11/1986 | Goldstein | 119/51 R |
| 4,712,511 | 12/1987 | Zamzow et al. | 119/52 B X |

FOREIGN PATENT DOCUMENTS 3623816 1/1987 Netherlands ................. 119/51 R

Primary Examiner—Robert P. Swiatek
Assistant Examiner—Nicholas D. Lucchesi
Attorney, Agent, or Firm—Oblon, Spivak, McClelland, Maier & Neustadt

[57] ABSTRACT

A poultry breeding method comprises the steps of providing a cage device for hens with an independent cage section so as to be free from contact with the other cages and auxiliary devices of the cage device, providing the independent cage section with a weight sensor for producing an electric signal representing the actual weight of hens housed in the cages of the independent cage section, applying the electric signal from the weight sensor to an electronic control device having stored therein ideal hen weight data relating to the hens housed in the cages, comparing the ideal hen weight data with the actual weight represented by the electronic signal, and using the result of the comparison for controlling the operation of a device for supplying feed to the hens. The method enables the hens to maintain at their ideal weight and their fecundity to be increased.

1 Claim, 4 Drawing Sheets

POULTRY BREEDING METHOD

BACKGROUND OF THE INVENTION

1. Field of the Invention

This invention relates to a poultry breeding method wherein the weight of the individual hens is controlled to the ideal level and more particularly to such a method wherein the weight of the individual hens is controlled by storing the ideal weight of the individual hens in an electronic control device in advance, comparing an electric signal representing the ideal weight of the individual hens with an electric signal representing the actual weight of the individual hens output from an independent cage section, and adjusting the amount of feed supplied to the hens according to the result of the comparison.

2. Prior Art Statement

It is known that the amount of feed (g) required by a laying hen per day is determined by the amount of energy that the hen metabolizes (metabolized energy M (Kcl)).

Moreover, the amount of metabolized energy M depends on the weight of the hen W (Kg), the ambient temperature T (°C.), the weight of eggs laid per day E (g), and the daily gain in body weight G (g).

In one experiment it was found, for example, that $$M = 279 - 59.5W + 25W^2 - 3.65T + 2.26E + 5G$$

Thus if the weight W of the hen is 1.7 Kg, the hen house temperature T is 20° C., the daily egg weight E is 53 g, and the daily weight gain G is 2 g, $$M = 306.88 \text{ (Kcl)}$$

The metabolized energy M being equal to the energy ME (Kcl) of the feed multiplied by the amount of feed consumed, it follows that $$ME \times (\text{amount of feed consumed}) = M$$

And if the energy ME of the feed normally used is 2900 KCl per Kg, it follows that $$\text{Amount of feed consumed} = \frac{306.88}{2900} = 0.10582 \text{ (Kg)} = 105.8 \text{ (g)}$$

Thus, under the conditions of the aforesaid experiment, each hen should be supplied with about 106 g of feed per day.

As the body weight W of the hen increases each day by the daily weight gain G, however, it is necessary to make a daily adjustment in the amount of feed supplied to the hen in accordance with the ideal weight gain curve.

In the conventional method, this adjustment is generally made, not daily, but about once a week. More specifically, a certain number of hens constituting a sampling are removed from their cages once per week and weighed, and the average weight of the sampled hens is used for calculating the amount of feed to be supplied to all of the hens.

In this conventional method, the work of removing the hens from their cages is extremely troublesome. Moreover, the hens themselves experience a high level of terror upon removal from their cages, and this is a cause for reduced laying.

Another problem is that the conventional method does not permit frequent weight checks accordingly it is impossible to carry out daily increases/decreases in the feed supply based on the ideal weight for the hens.

When the amount of feed supplied is less than that based on the ideal hen weight, the weight of the hen will gradually decrease, and the hen will continue laying at the sacrifice of its own weight up to the point where this is no longer possible, whereafter it will stop laying altogether. This leads to a pronounced decrease in the laying rate. On the other hand, supplying the hen with an amount of feed that is greater than that based on the ideal weight of the hen results in wasted consumption of costly feed and a corresponding economic loss. What is more, the hens become too plump, which results in a drop in laying rate and excessively fatty hens.

OBJECTS OF THE INVENTION

An object of this invention is to provide a poultry breeding method whereby the weight of the individual hens can be maintained at the ideal level, and the fecundity of the hens can be maximized.

Another object of this invention is to provide a poultry breeding method whereby the breeding of hens can be carried out economically without need for the troublesome work of removing a large number of hens from their cages and with the consumption of costly feed being held to the minimum required.

SUMMARY OF THE INVENTION

For achieving these purposes, the poultry breeding method according to the present invention comprises the steps of providing a cage device consisting of a frame standing on a base and having installed thereon a plurality of cage tiers each consisting of a row of horizontally arranged cages; incorporating in the cage device an independent cage section consisting of a plurality of cages supported on a suspension frame; providing the cage device with feed troughs, water supply means, and egg conveyor belts disposed not to make contact with the independent cage secton; providing the independent cage section with a weight sensor means for producing an electric signal representing the actual weight of hens housed in the cages of the independent cage section; applying the electric signal from the weight sensor means to an electronic control device having stored therein ideal hen weight data relating to the hens housed in the cages; comparing the ideal hen weight data with the actual weight represented by the electronic signal; and using the result of the comparison for controlling the operation of a device for supplying feed to the hens. By so controlling the supply of feed, the hens can be constantly maintained at their ideal weight, and their fecundity can be increased.

By incorporating the independent cage section in the cage device, it becomes possible to measure the actual weight of the chickens with high accuracy, whereafter the amount of feed to be supplied can be determined on the basis of the comparison between the actual weight and the ideal weight. Thus the hens can be maintained at their best weight, which results in an improvement in their laying rate. Moreover, as the hens are weighed by the use of a gauge or the like, they can be weighed with ease and without causing them to experience fear, which is known to be a cause for reduced laying.

The above and other features of the present invention will become apparent from the following description made with reference to the drawings.

DETAILED DESCRIPTION OF THE PREFERRED EMBODIMENT

Figure 1:
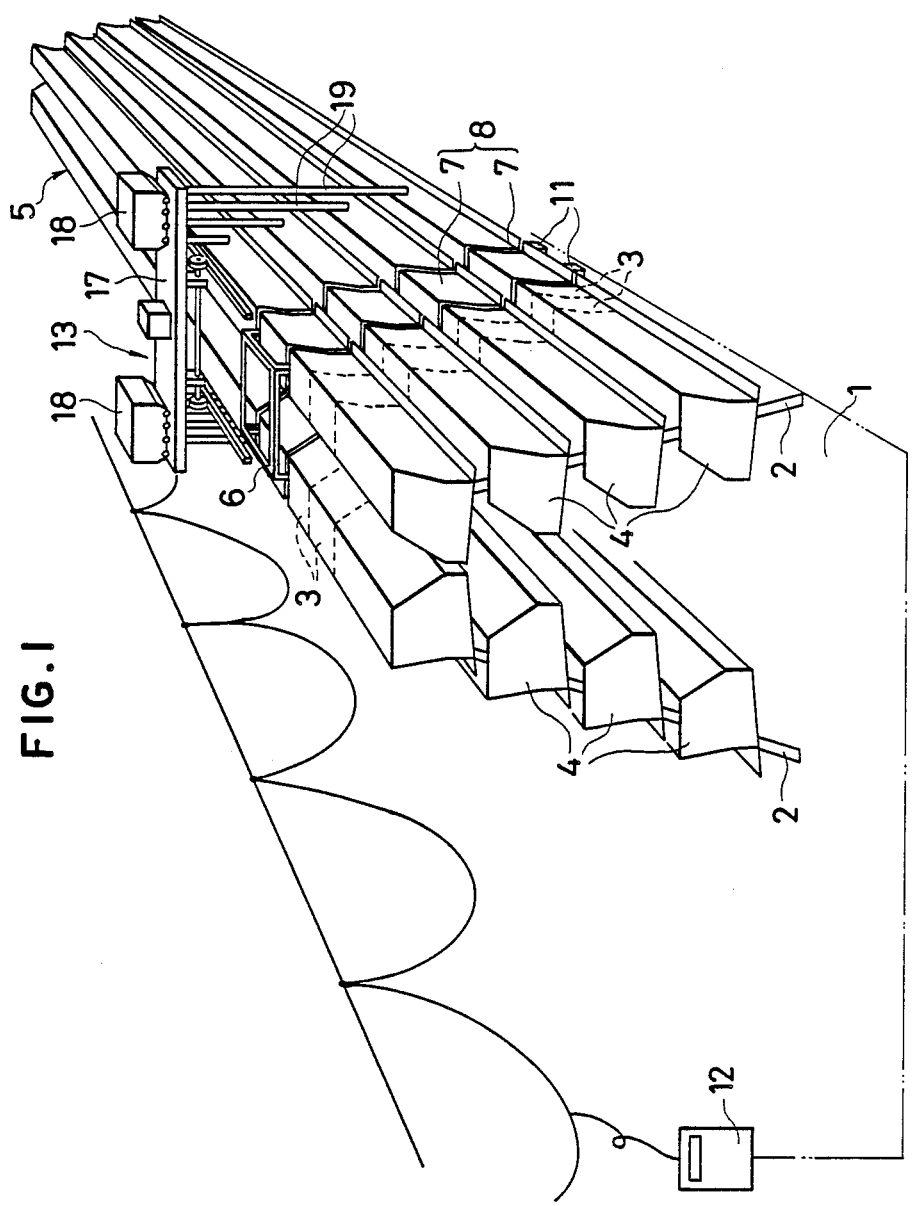
FIG. 1 is a schematic perspective view of the overall arrangement of a poultry breeding device for carrying out the poultry breeding method of this invention.

The figures illustrate a poultry breeding device for carrying out the poultry breeding method according to the present invention. The device comprises a cage device 5 having a frame 2 which stands on a base 1 such as a concrete floor; a plurality of cage tiers each consisting of a row 4 of horizontally disposed cages 3 are supported on the frame 2. One portion of the cage device 5 is constituted as an independent cage section 8 consisting of a gallows-shaped suspension frame 6 supporting a plurality of cages 7. The cage device 5 is provided with feed troughs 9, water supply means (not shown), egg conveyor belts 10, and the like which are disposed so as not to come in contact with the independent cage section 8. A plurality of weight sensors 11, which may for example be load cells, are provided at the bottom of the suspension frame 6 of the independent cage section 8 such that the entire weight of the independent cage section 8 comes to bear thereon. The weight sensors 11 are electrically connected with an electronic control device 12 located either inside or outside of the hen house.

Data on the ideal weight curve (the ideal daily weight change) of the hens is stored in the electronic control device 12 in advance, and the signal continuously fed to the electronic control device 12 from the weight sensors 11 is compared with the ideal weight curve by the electronic control device 12. The result of this comparison is used to control a feed supply means 13 in such a way that the feed supply means 13 supplies to the feed troughs 9 the amount of feed required to maintain the hens at their ideal weight.

As in the aforesaid example, the weight sensors 11 may be provided at the bottom of the legs of the independent cage section 8, where they will bear the full weight thereof. Alternatively, however, a plurality of the weight sensors can be fixed to an upper portion of the hen house and the independent cage section be suspended therefrom.

In the aforesaid poultry breeding method, hens are kept under identical conditions in the cages 7 of the independent cage section 8 and in the other cages 3 of the cage device 5. Thus all cages must be provided with feed troughs, water supply means, and the like, but those for the cages 7 of the independent cage section 8 must be kept out of contact with the independent cage section 8. This can be easily realized by running these various means horizontally along the cages with the portions serving the cages 7 bridged across the space between the cages 3 on the opposite sides of the independent cage section 8.

Figure 4:
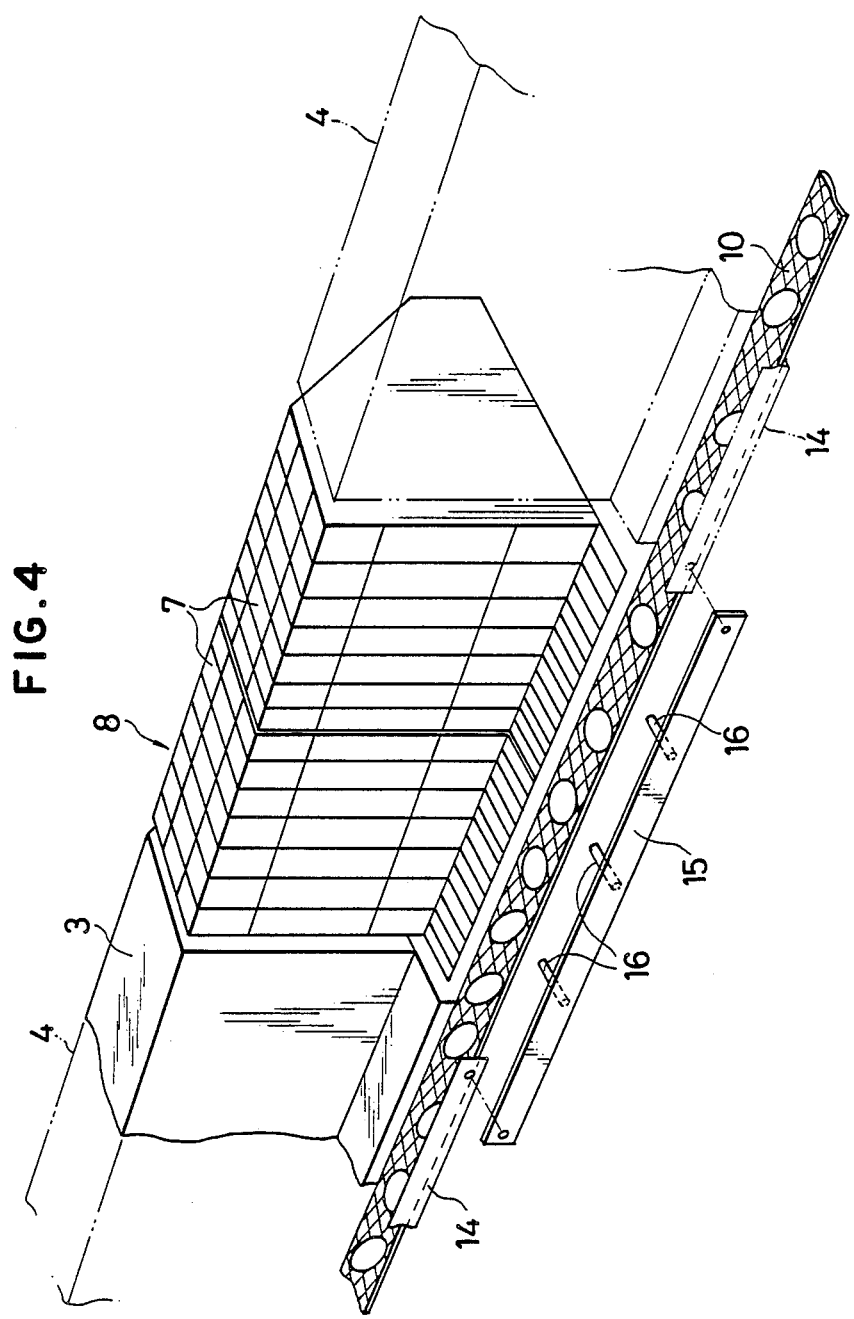
FIG. 4 is an enlarged perspective view of an important portion of the poultry breeding device of FIG. 1.

The egg conveyor belts 10 which run in front of the cages at the level of the floors thereof must also be kept out of contact with the independent cage section 8. As shown in FIG. 4, this can be realized by cutting away that portion of a guide member 14 for each egg conveyor belt 10 which would otherwise pass in front of the independent cage section 8 and by bridging the gap at the cut-away portion with a horizontal support member 15 having support rods 16 which project under and support the egg conveyor belt 10 at the portion where it passes in front of the cages 7. With this arrangement, the egg conveyor belts 10 need not make contact with the independent cage section 8 or the cages 7 but are still able to collect and convey the eggs laid by the hens in the cages 7.

With the aforesaid arrangement, therefore, the hens in the cages 7 can be raised under the same conditions as those in the cages 3 in spite of the fact that the cages 7 are independently supported without making contact with any of the feed troughs 9, egg conveyor belts 10, or the like.

On the other hand, since the weight sensors 11 of the independent cage section 8 are electrically connected with the electronic control device 12, a signal representing the total weight of the independent cage section 8 is fed to the electronic control device 12. The electronic control device 12 subtracts the weight of the suspension frame 6, cages 7, and the like of the independent cage section 8 from this total weight to obtain the total weight of the hens kept in the independent cage section 8. As the so-calculated weight is the actual weight of the hens, it varies with the passage of time as well as with changes in the various conditions. Moreover, it is supplied continuously and thus provides a basis for accurate calculation at all times.

The ideal weight curve for the hens is stored in the electronic control device 12 in advance. This weight curve represents the time-course change in weight the hens should ideally follow to maintain their laying rate at maximum at all times and enables the ideal weight of the hens to be determined at fixed time intervals of, say, 12 hours or 24 hours. When the actual weight of the hens is brought as close as possible to that dictated by the ideal weight curve, both the feed economy and the laying rate are maximized.

Thus the electronic control device 12 compares the signal derived from the weight sensors 11 with that obtained from the ideal weight curve, and the result of this comparison is used to control the operation of the feed supply means 13 so as to adjust the supply of feed to the feed troughs 9 for the respective cage rows 4 such that the actual weight of the hens will approach the ideal weight.

Figure 2:
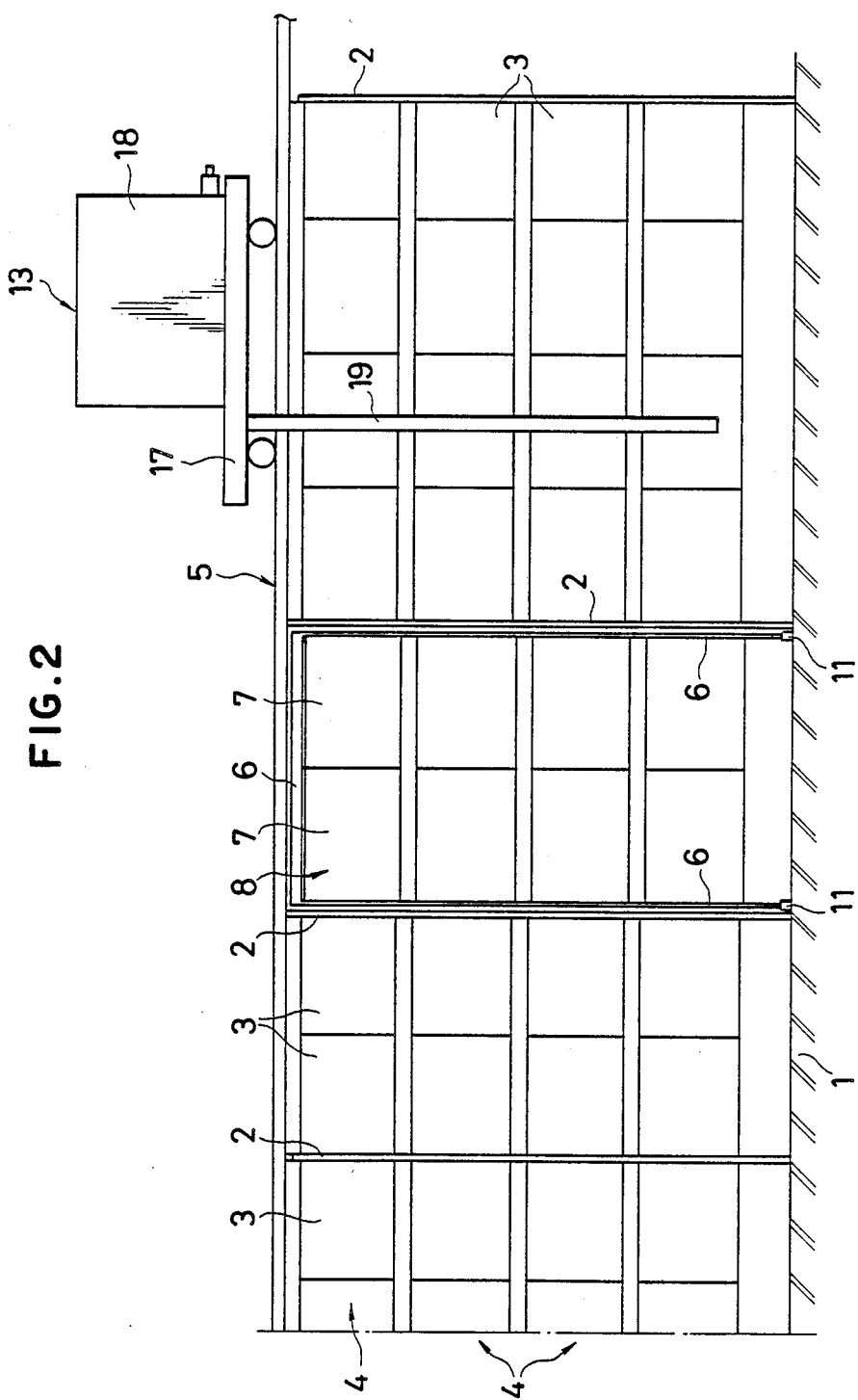
FIG. 2 is a side view of an important portion of the poultry breeding device of FIG. 1.
Figure 3:
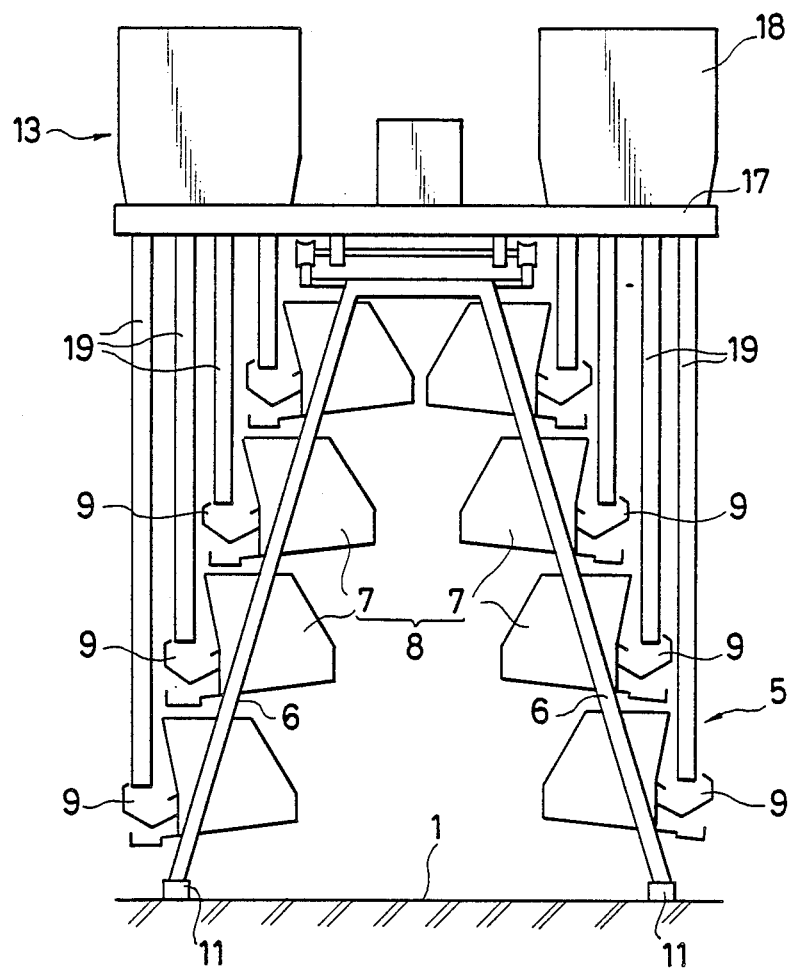
FIG. 3 is vertical sectional view of the poultry breeding device of FIG. 1.

As the feed supply means 13, there can, as shown in FIGS. 1-3, be used an arrangement wherein feed hoppers 18 are mounted on a frame 17 which travels above the cage device 5, supply pipes 19 are provided to extend between each feed hopper 18 and the feed troughs 9 it serves, and the amount of feed supplied through the supply pipes 19 is controlled by a screw conveyor (not shown) provided at the bottom of the feed hopper 18.

With this arrangement, if the electronic control device 12 is electrically connected with the motor of the screw conveyor of the feed supply means 13, the screw conveyor can be driven based on the numerical value resulting from the comparison conducted in the electronic control device 12, whereby the optimum amount of feed can be supplied to the supply pipes 19, and the hens can be raised under the optimum condition.

While the electronic control device 12 can, if desired, be installed in an office within the hen house, this may prove inconvenient in cases where several cage devices 5 are installed in the same hen house, since it requires that separate lead wires be provided between the electronic control device 12 and the screw conveyor motor of each feed supply means 13 in use. It is therefore generally preferable to install a separate electronic control device 12 on each feed supply means 13.

The present invention has been shown and described with reference to a specific embodiment. However, it should be noted that the invention is in no way limited to the details of the described arrangement, and changes and modifications may be made without departing from the scope of the appended claims.

For example, while in the embodiment described above and shown in the figures the feed supply means is of the self-propelled type and employs a screw conveyor, it may employ other types of screw systems or employ a chain system.

As described in the foregoing, in the present invention a cage device is provided with an independent cage section, the actual weight of the hens in the independent cage section is accurately measured, the amount of feed which should be supplied to the hens is determined based on a comparison between the measured actual weight and an ideal weight curve for the hens, and the amount of feed supplied is controlled on the basis of the so-determined amount. As a result, the hens can be maintained at their ideal weight at all times, whereby the laying rate of the hens can be optimized. Moreover, the invention obviates the conventional troublesome work of removing a large number of hens from their cages in order to weigh them. Also the hens become neither overweight nor underweight. Thus, since the amount of feed consumed can be held to the minimum required, the invention provides a considerable economic advantage as well.

What is claimed is:

1. A poultry breeding method comprising the steps of:
    (a) providing a cage device comprising a frame standing on a base and having installed thereon a plurality of cage tiers each comprising a row of horizontally arranged cages;
    (b) incorporating in the cage device an independent cage section comprising a plurality of cages supported on a suspension frame;
    (c) providing the cage device with feed troughs, water supply means, and egg conveyor belts disposed not to make contact with the independent cage section;
    (d) providing the inside of each cage of the independent cage section with a weight sensor means for producing an electric signal representing the actual cumulative weight of all hens housed in the cages of the independent cage section;
    (e) applying the electric signal from the weight sensor means to an electronic control device having stored therein ideal hen weight data relating to the hens housed in the cages;
    (f) comparing the ideal hen weight data with the actual weight represented by the electronic signal; and
    (g) using the result of the comparison for controlling the operation of a device for supplying feed to the hens in an amount which enables the hens to be constantly maintained at their ideal weight and their fecundity to be increased.

* * * * *